Patented Mar. 29, 1949

2,465,868

UNITED STATES PATENT OFFICE 2,465,868

PROCESS FOR THE MANUFACTURE OF DERIVATIVES OF ACRIDINE

Alan August Goldberg, William Kelly, and Harold Silas Turner, Bradford-on-Avon, England, assignors to Ward, Blenkinsop & Company Limited, Liverpool, and Howards & Sons Limited, Ilford, England, both British companies No Drawing. Application October 5, 1946, Serial No. 701,414. In Great Britain October 11, 1945

10 Claims. (Cl. 260—251)

1

This invention relates to acridine derivatives carrying a substituent in the meso-position of the acridine nucleus an aminopyrimidine residue.

The invention provides 5'-[acridyl-(9)]-aminopyrimidines having the general formula

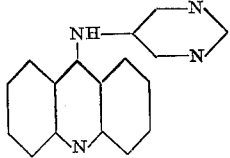

These acridine derivatives may contain additional substituents in either or both of the benzenoid nuclei of the acridine residue and/or additional substituents in the amino-pyrimidine residue.

The invention also provides a process for the production of 5'-[acridyl-(9)]-aminopyrimidines of the said general formula which comprises heating a meso-halogenated acridine with a 5-aminopyrimidine in the presence of a phenol.

The meso-halogenated acridines which may be used in accordance with the invention are preferably meso-chloroacridines. In addition to the meso-halogen substituent the acridines may contain, in either or both benzenoid nuclei, one or more further substituents such as alkyl, alkoxy, nitro, disubstituted amino, cyano and halogen. Examples of such compounds are 9-chloroacridine, 9-bromoacridine, 2-methoxy-9-chloroacridine, 2- and 3-cyano-9-chloroacridines, 2-methoxy-6-cyano-9-chloroacridine, 2-methoxy-6,9-dichloroacridine, 2-methoxy-6,9-dibromoacridine, 2-dimethylamino-6,9-dichloro-acridine and 2-methoxy-7-cyano-9-chloroacridine.

The 5-aminopyrimidine employed in accordance with the invention may or may not contain one or more additional substituents such as alkyl, aryl, alkoxy, aryloxy, hydroxy, halogen, nitro, amino and substituted amino groups. Thus there may be employed a 5-aminopyrimidine containing one or more additional amino groups, for example, a 2,5-diaminopyrimidine and this may or may not contain additional substituents. Examples of substituted 5-aminopyrimidines which may be employed are 2,4-dihydroxy-5-aminopyrimidine, 2,4,6-trihydroxy-5-aminopyrimidine, 2,4-dihydroxy-6-methyl-5-aminopyrimidine, 2,4-dihydroxy-6-phenyl-5-aminopyrimidine, 2,6-dimethyl-4-hydroxy-5-aminopyrimidine, 2,6-dimethyl-4-chloro-5-aminopyrimidine, 2,5-diamino-4-hydroxy-6-methylpyrimidine, 2,5-diamino-4,6-dimethylpyrimidine and 2,5-diamino-4,6-dichloropyrimidine.

The reaction between the meso-halogenated acridine and the 5-aminopyrimidine may be brought about by heating the reactants together in the presence of a phenol, preferably present in excess, whence the resulting pyrimidine derivative may be isolated in the form of the corresponding hydrohalide by pouring into a normally liquid ether or ketone such as diethyl ether or acetone. Alternatively the reaction mixture may be poured into a solution of aqueous alkali whence the free base may be directly isolated. Phenol itself, one or more of the isomeric cresols or one or more higher alkylated phenols may be employed. Mixed alkylated phenols may also be employed.

It is believed that the reaction described proceeds through the intermediate formation of a meso-phenoxy compound and, in accordance with a feature of the invention, this may be first produced by heating together the meso-halogenated acridine and the phenol or mixture of phenols employed and the product then reacted with the 5-aminopyrimidine, with or without intermediate isolation of the meso-phenoxy compound.

When the hydrohalide is isolated as such from the reaction mixture the free base may be readily obtained by any of the customary methods, for example, trituration with aqueous alkali.

Products obtained in accordance with the invention have valuable pharmacological properties such as antiplasmodial properties.

The following examples illustrate the manner in which the invention may be carried into effect.

*Example 1*

57 parts of 2-methoxy-6,9-dichloroacridine is dissolved in 500 parts of molten phenol and the solution heated to 100–110° C. for 30 minutes. 25 parts of 2,5-diaminopyrimidine are then added with stirring, the mixture heated for a further 2 hours at 105–110° C. cooled and poured into 3000 parts of water. The yellow precipitate which separates is collected, ground with cold dilute caustic soda solution, washed and dried whence 60 parts of 5'-[2-methoxy-6-chloroacridyl-(9)-]amino-2'-aminopyrimidine is obtained as a yellow powder M. P. 290° C. Recrystallisation from dilute pyridine gives the compound in the form of small yellow leaves M. P. 294–296° C. (Found: N, 20.3; Cl, 10.0. $C_{16}H_{14}ON_5Cl$ requires: N, 20.2; Cl, 10.1%.)

*Example 2*

66 parts 2-methoxy-6-chloro-9-phenoxy acridine (prepared by heating together 2-methoxy-6,9-dichloro-acridine and phenol) is dissolved in 500 parts of molten phenol, the solution heated to 110° C. and 25 parts of 2.5-diaminopyrimidine added. The solution is heated for 2 hours at this temperature, cooled and poured into an excess of cold dilute sodium hydroxide solution with stirring when 5'-(2-methoxy-6-chloro-acridyl-(9)-) 2'-amino-pyrimidine is precipitated as a yellow powder in good yield.

We claim:

1. As a new product a 5'-[acridyl-(9)]-aminopyrimidine of the general formula

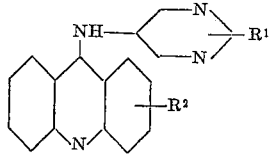

in which $R^1$ is selected from the group consisting of hydrogen and amino and $R^2$ is selected from the group consisting of hydrogen, halogen and alkoxy.

2. As a new product a 5'-[acridyl-(9)]-amino pyrimidine of the general formula

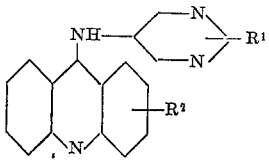

in which $R^1$ is selected from the group consisting of hydrogen and amino and $R^2$ is selected from the group consisting of hydrogen, halogen and methoxy.

3. As a new product a 5'-[acridyl-(9)]-aminopyrimidine of the general formula

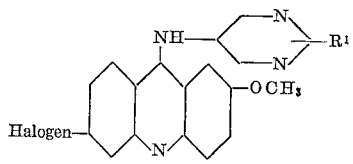

in which $R^1$ is selected from the group consisting of hydrogen and amino.

4. As a new product a 5'-[acridyl-(9)]-aminopyrimidine of the general formula

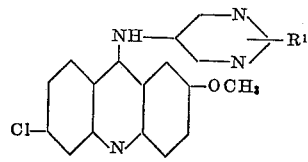

in which $R^1$ is selected from the group consisting of hydrogen and amino.

5. As a new product a 2'-amino-5'-[2-methoxy-6-halogeno-acridyl-(9)]-aminopyrimidine.

6. As a new product 2'-amino-5'-[2-methoxy-6-chloroacridyl-(9)]-aminopyrimidine.

7. A process for the production of a 5'-[acridyl-(9)]-aminopyrimidine which comprises heating a meso-halogenated acridine with a 5-aminopyrimidine in the presence of a compound selected from the group consisting of phenol and alkylated phenols to produce a compound of the general formula

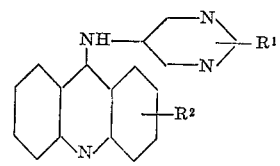

in which $R^1$ is selected from the group consisting of hydrogen and amino and $R^2$ is selected from the group consisting of hydrogen, halogen and alkoxy.

8. A process for the production of a 5'-[acridyl-(9)]-aminopyrimidine which comprises heating an acridine having the general formula

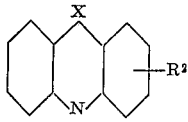

in which X is selected from the group consisting of phenoxy and alkylated phenoxy radicals and $R^2$ is selected from the group consisting of hydrogen, halogen and alkoxy, with a 5-aminopyrimidine to produce said 5'-aminopyrimidine.

9. The process which comprises heating a 2-methoxy-6.9-dihalogen acridine with a 2.5-diaminopyrimidine in the presence of a compound selected from the group consisting of phenol and alkylated phenols to produce a 2'-amino-5'-[2-methoxy-6-halogeno-acridyl-(9)]-aminopyrimidine.

10. The process which comprises heating a 2-methoxy-6.9-dihalogen acridine with a 5-aminopyrimidine in the presence of a compound selected from the group consisting of phenol and alkylated phenols to produce a 5'-[2-methoxy-6-halogeno-acridyl-(9)]-aminopyrimidine.

ALAN AUGUST GOLDBERG.
WILLIAM KELLY.
HAROLD SILAS TURNER.

No references cited.

Certificate of Correction

Patent No. 2,465,868.

March 29, 1949.

ALAN AUGUST GOLDBERG ET AL.

It is hereby certified that errors appear in the printed specification of the above numbered patent requiring correction as follows:

Column 1, line 51, after the comma and before "2.5-diami-" insert *2.5-diaminopyrimidine,*; column 2, line 40, for the word "water" read *ether*;

and that the said Letters Patent should be read with these corrections therein that the same may conform to the record of the case in the Patent Office.

Signed and sealed this 13th day of September, A. D. 1949.

[SEAL]

JOE E. DANIELS,
*Assistant Commissioner of Patents.*